US010832277B2

(12) United States Patent
Bordash et al.

(10) Patent No.: US 10,832,277 B2
(45) Date of Patent: Nov. 10, 2020

(54) KEYWORD BASED ADVERTISING BASED ON SITE SEARCH DATA

(71) Applicant: INTERNATIONAL BUSINESS MACHINES CORPORATION, Armonk, NY (US)

(72) Inventors: Michael J. Bordash, Newtown, CT (US); Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 15/433,457

(22) Filed: Feb. 15, 2017

(65) Prior Publication Data
US 2018/0232759 A1   Aug. 16, 2018

(51) Int. Cl.
*G06Q 30/00* (2012.01)
*G06Q 30/02* (2012.01)
*G06F 16/33* (2019.01)

(52) U.S. Cl.
CPC ....... *G06Q 30/0244* (2013.01); *G06F 16/334* (2019.01); *G06Q 30/0256* (2013.01)

(58) Field of Classification Search
None
See application file for complete search history.

(56) References Cited

U.S. PATENT DOCUMENTS

| 7,346,703 B2* | 3/2008 | Cope | G06F 11/3438 709/238 |
| 7,792,954 B2* | 9/2010 | Hanson | G06Q 30/02 709/219 |
| 7,860,859 B2* | 12/2010 | Haugen | G06Q 30/0256 705/14.54 |
| 7,962,463 B2* | 6/2011 | Cava | G06F 16/3322 707/706 |
| 8,392,249 B2* | 3/2013 | Koningstein | G06Q 30/02 705/14.41 |

(Continued)

OTHER PUBLICATIONS

Thomaidou et al., Multiword Keyword Recommendation System for Online Advertising, 2011, IEEE (Year: 2011).*

(Continued)

*Primary Examiner* — Naresh Vig
(74) *Attorney, Agent, or Firm* — Schmeiser, Olsen & Watts; Stephanie Carusillo

(57) ABSTRACT

This invention relates to a method, system and computer program for assessing enhanced dynamic keyword-based advertising campaigns, such that a site-level keyword search request of a web page is tracked, where the site-level keyword search request includes at least one search term. The frequency of usage of the search term of the site-level keyword search request is monitored, and the frequency of usage of the search term is compared with a predetermined value. At least one popular term is identified in response to comparing the frequency of usage of the search term with the predetermined value. The popular term is compared with a plurality of existing keyword-based advertising campaigns. It is determined whether the popular term is to be included in the advertising campaign included in the existing keyword-based advertising campaigns, whereby an effectiveness of the advertising campaign may be evaluated.

20 Claims, 5 Drawing Sheets

(56) References Cited

U.S. PATENT DOCUMENTS

| | | | |
|---|---|---|---|
| 9,129,312 B1 | 9/2015 | Scholl et al. | |
| 9,508,081 B2* | 11/2016 | Yavilevich | G06Q 30/02 |
| 2006/0069616 A1* | 3/2006 | Bau | G06Q 30/02 |
| | | | 705/14.53 |
| 2008/0288347 A1* | 11/2008 | Sifry | G06Q 30/02 |
| | | | 705/14.41 |
| 2013/0151496 A1* | 6/2013 | Jacobs | G06F 16/951 |
| | | | 707/706 |
| 2013/0311270 A1 | 11/2013 | Daftary et al. | |
| 2014/0032306 A1 | 1/2014 | Sukornyk et al. | |
| 2014/0258001 A1* | 9/2014 | Ramaksrihnan | G06Q 30/0276 |
| | | | 705/14.72 |
| 2015/0025977 A1* | 1/2015 | Doyle | G06Q 30/0269 |
| | | | 705/14.66 |

OTHER PUBLICATIONS

Christopher Ratcliff, "What are the top 10 most popular search engines?", Aug. 8, 2016, www.SearchEngineWatch.com (Year: 2016).*

Zhang, Guojun et al.; Method and System for Delivering Transient Visual Advertisements with Search Results Layout; IP.com; IPCOM000233864D; Dec. 24, 2013; 3 pages.

Gupta, Arpit; Method and System for Real-Time Display of Advertisements and Search results Based on Real-Time Intent of a User; IP.com; IPCOM000197530D; Jul. 13, 2010; 3 pages.

Lahaie, Sebastien et al; Method and System for Ranking Keyword Suggestions in Online Advertising; IP.com; IPCOM000217456D; May 8, 2012; 6 pages.

* cited by examiner

KEYWORD BASED ADVERTISING BASED ON SITE SEARCH DATA

FIELD OF THE INVENTION

This disclosure relates generally to an advertising campaign, and, in particular, to a method and system to enhance a keyword-based advertising campaign based on updated search term analysis.

BACKGROUND OF THE INVENTION

Many search engine services, such as Google and Safari, provide for searching for information that is accessible via the Internet. These Internet search engine services allow users to search for web pages and other Internet-accessible resources that may be of interest to users. After a user submits a search request that includes search terms, the search engine service identifies web pages that may be related to those search terms.

To quickly identify related web pages, the Internet search engine services may maintain a mapping of keywords to web pages. This mapping may be generated by "crawling" the Internet or web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. Some search engine services can even search information sources that are not accessible via the Internet. For example, a book publisher may make the content of its books available to a search engine service. The search engine may generate a mapping between the keywords and books.

When a search engine service receives a search request that includes one or more search terms, the search engine uses mapping to identify those information sources (e.g., web pages or books) whose keywords most closely match the search terms. The collection of information sources that most closely matches the search terms is referred to as the "search result." The search engine service then ranks the information sources of the search result based on the closeness of each match, web page popularity (e.g., Google's page ranking), and so on. The Internet search engine service then displays to the user links to those information sources in an order that is based on the result rankings. The user may then enter the specific web site of interest by clicking on the link displayed by the Internet search engine service. After the user clicks on the link, the user enters the specific web site, and the user may conduct a further keyword search, i.e., site-level search, within the web site.

Some search engine services do not charge a fee to the providers of web pages for including links to the web pages in search results. Rather, the search engine services obtain revenue by placing advertisements along with search results. These paid-for advertisements are commonly referred to as "sponsored links," "sponsored matches," or "paid-for search results."

An advertiser who wants to place an advertisement along with certain search results provides a search engine service with a prospective advertising bid. Typical prospective advertising bids include (1) one or more search terms, (2) a bid amount, and (3) an advertising message. When a search request is received from a user, the search engine service identifies one or more of the already-received prospective advertising bids meeting certain criteria, such as those having the highest bid amounts among those including matching search terms, or those having the highest expected value among those including matching search terms. The engine service returns a search result in response to the received search request that includes the advertising messages of each of the identified prospective advertising bids. This search result, together with the included advertising messages, is displayed to the user as a prospective advertising campaign.

These advertisements require a great deal of ongoing effort for an advertiser to select search terms and optimize its bids for these search terms. There tends to be a practical limit to the dynamic nature by which an advertiser may maintain advertising campaigns. Also, an advertiser may not be aware of trending products or markets. An advertiser must to be able to anticipate search terms that will be included in future search queries. It is not currently possible to track and assess the popularity of term on the site-search level; i.e., when a search is conducted within a web site rather than an Internet search conducted on the web, or to assess current trends for a particular domain.

SUMMARY OF THE INVENTION

This invention relates to a method, system and computer program for assessing and generating enhanced dynamic keyword-based advertising campaigns and keyword-based on-line advertisements, such that a site-level keyword search request of a web page is tracked, where the site-level keyword search request includes at least one search term. The frequency of usage of the at least one search term of the site-level keyword search request is monitored, and the frequency of usage of the at least one search term is compared with a predetermined value. At least one popular term from the at least one search term is identified in response to comparing the frequency of usage of the at least one search term with the predetermined value. The at least one popular term is compared with a plurality of existing keyword-based advertising campaigns. It is determined that the at least one popular term is to be included in at least one advertising campaign included in the plurality of existing keyword-based advertising campaigns, whereby an effectiveness of said at least one advertising campaign may be evaluated based on said corresponding usage.

DETAILED DESCRIPTION OF THE EMBODIMENTS

Figure 1:
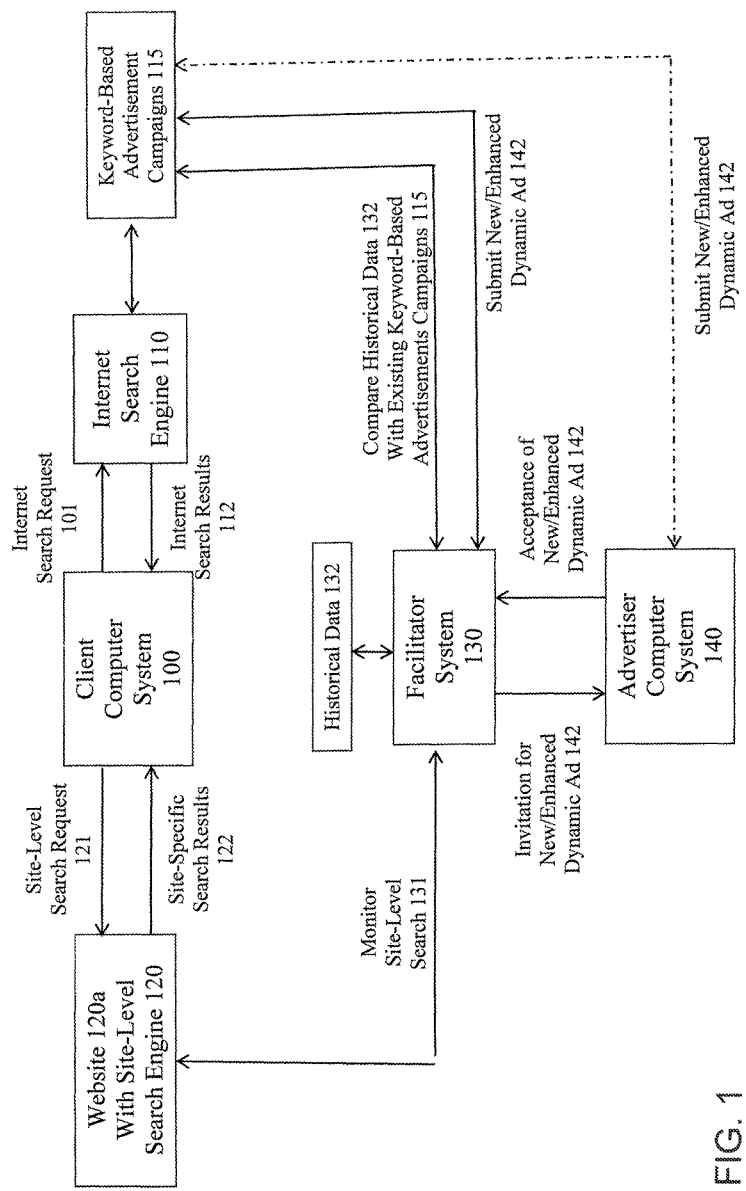
FIG. 1 is a data flow diagram showing a typical data flow performed in accordance with an embodiment of the present invention.

A software facility to support enhancing query-based advertising opportunities is described, wherein user interactions within a specific web site, and particularly, a specific keyword search made on the site search level is utilized to improved paid on-line advertising campaigns. In accordance with the facility, when a search engine receives a search request containing a search query, the search engine will display results of the search. Then, a user will then enter a desired web site or web page for viewing purposes. Within that web site or web page, the user may then conduct a site-specific keyword search at the site search level. Of course, the user may directly enter the web site or web page without first conducting an Internet search when the user has the ability to directly enter the web site or web page. In either instance, once the user has entered a relevant web site, the user may conduct a site-level search of the specific web site.

When a keyword search is conducted at the site search level, which is separate and apart from the search engine query, the facility according to this invention will monitor the search terms used with the site search level. The facility will track the frequency and popularity of search terms within the site search level. The facility will then compare these real-time site level search terms; i.e., search terms used on a specific site level search, with terms associated with existing keyword-based advertising campaigns employed by search engine operators. If the real-time search terms are not part of an existing keyword-based advertising campaign, the facility will suggest updating the existing keyword-based search campaign on the search engine level. In the alternative, the facility may suggest an entirely new keyword-based advertising campaign on the search engine level based on the real-time search terms compiled during searches conducted on the site level search, when the real-time search terms are not part of an existing keyword-based advertising campaign(s).

Likewise, it is possible by way of the present invention to assess when a particular search term is no longer popular or its popularity has fallen below a predetermine value. In this instance, a notification may be sent advising interested parties that a certain advertisement or class of advertisement may be eliminated or may have reduced in value.

In accordance with this invention, the facility engine may send an invitation for enhanced dynamic advertisements containing a set of keywords from the site-level search query to: (1) the one or more advertisers, (2) a demand management platform, and/or (3) to a search engine. Such dynamic advertisements may then be applied to the search engine level. When an advertiser or other relevant party receives an invitation, the advertiser analyzes the keywords, and determines whether it wishes to utilize the dynamic advertisement to include the search terms determined not to be part of an existing keyword-based advertisement campaign. If so, the advertiser responds to the notification with acceptance of the dynamic advertisement. If the search engine accepts the dynamic advertisement, it includes the specified advertising message in the search results returned by the search engine in response to the query.

In the alternative, the advertiser may generate an entirely new advertisement campaign based on the notification by the facilitator that the popular site level search terms are not part of an ad campaign on the search engine level. Similarly, the facilitator may produce a notification that an advertising campaign may be eliminated or that a particular advertising campaign has fallen in value based on the popularity of site-level search terms.

A demand-side platform (DSP) or demand management platform is a system that allows buyers of digital advertising inventory to manage multiple ad exchange and data exchange accounts through one interface. Real-time bidding for displaying advertising takes place within the ad exchanges, and by utilizing a DSP, marketers can manage the bids for the banners and the pricing for the data that they are layering on to target the audiences. In accordance with this invention, the system may communicate with the DSP to create dynamic advertisements when the system determines that popular terms identified on site-level searches are not a part of existing keyword-based advertising campaigns. Alternatively, the ultimate advertiser may communicate directly with the DSP to create dynamic advertisements when the system determines that popular terms identified on site-level searches are not a part of existing keyword-based advertising campaigns.

In some embodiments, the advertiser considers an invitation for dynamic advertisement by applying the enhanced keywords against its own item catalog, repository, or other database of advertising subject information to identify an item or a category of items that can be purchased or otherwise obtained from the advertiser and that related to the search query. In some embodiments, the facility constructs a custom advertising campaign featuring the identified item or category that is specifically responsive to the notification, such as the time at which it is received, the language in which the search query is expressed, information about the user's identity or characteristics, information about the amounts of already-known advertisements, etc. In some embodiments, the facility selects an advertisement based upon the profitability of the item, the historical effectiveness of advertising on the notifying search engine, information about the user's identity or characteristics, etc.

By facilitating enhanced query-based advertising opportunities in some or all of the ways described above, the facility enables advertisers to more effectively use query-based advertising and to drill down on specific search terms that are specific to a site or product category. For example, a particular company, e.g., Mike's Bike's, may discover that a specific term is being used on the web site for Mike's Bikes with unique frequency, then this company may decide to enhance its current advertising campaign or may decide to generate an entirely new ad campaign based on the notification that certain search terms have gained frequency and popularity on the Mike's Bikes web page. This approach allows the keyword-based advertising to be dynamic and recognize industry spikes. Also, the facility may enable a search engine to reduce its level of overhead for query-based advertising, increase revenues from query-based advertising, and/or make query-based advertising messages more relevant to and appreciated by its users.

FIG. 1 is a data flow diagram showing a typical data flow performed in accordance with an embodiment of the present invention. A client computer system 100 may send a search request 101 to a search engine computer system 110 in a manner that is known to those of skill in the art.

The search request may include a sender IP address of the client computer system, a cookie stored for the search engine domain on the client computer system, and a search query. Those skilled in the art will appreciate that such sample search request is merely exemplary, and that embodiments of the facility may use corresponding data structures having more, less, or different content, organized, formatted, and/or encoded in various ways. In particular, certain data items shown may be optional to provide, or universally excluded.

The search engine computer system 110 in turn responds with a search response with search results 112, typically with existing advertisements prompted by the research request 101. Next, the user clicks on a link included in the search results 112; the link is to a specific website 120a having a site level search engine 120. As previously stated, the user may directly enter the specific web site 120a without having to conduct the initial search request 101.

Once on the website 120a, the user may conduct a site level search request 121 using the site level search engine 120. The site level search engine 120 returns site-specific search results 122 to the client computer system 100. Typically, these site-specific search results 122 relate to specific products or programs being promoted on the website 120a. Of course, the exact nature of the site-level search results 122 will depend on the nature and category of information provided on the website 120a and the site-level search request 121 made by the user. The site-level search request 121 and related search results 122 may encompass any domain of knowledge including, but not limited to, products, services, hobbies, educational materials, entertainment, news, finance, business, politics, etc.

The facilitator system 140, according to this invention, monitors the site level search terms 131 used on the site level search 121 and records the frequency and popularity of the search terms used in the site level search 121 to create historical data 132 for the site level searches 121. Next, the facilitator system 130 compares the historical data 132 of the site level search 121 to the existing keyword based advertising campaigns 115 maintained by the Internet search engine 110. When the facilitator system 130 recognizes that there is a discrepancy between the historical data 132 of the site level searches 121 and the existing keyword based advertising campaigns 115, the facilitator system 130 sends a notification or invitation 142 to the advertiser computer system 140 suggesting an updated advertising campaign or an entirely new advertising campaign based on the historical data 132 of the site level search 121. In some embodiments, the facilitator system 130 may send invitations corresponding to the site level search request to the advertiser computer systems 140 of multiple advertisers. In some embodiments, the facilitator system 130 of multiple site level search engines 120 may send search invitations to the same advertiser computer system 140.

In an alternate embodiment, the facilitator system 130 may communicate with a demand side platform (DSP) or demand management platform to notify the platform(s) that an opportunity exists for a new or enhanced advertising campaign. In accordance with this invention, the facilitator system 130 will communicate will any and all necessary parties who may be interested in generating new or enhanced dynamic advertisements in accordance with the site-level keyword monitoring described herein.

In addition to the information in the sample search request, the sample search notification includes a publisher ID identifying the publisher sending the notification, a notification ID identifying the notification, an indication of the present high bid to advertise in the result for the search request, and profile information retrieved by the search engine using the sender IP address and/or the sender cookie.

In some cases, in response to the search notification, the advertiser computer system 140 may send the facilitator system 134 a notification response—also called a "dynamic bid"—143 containing a bid for including an advertising message in a search result generated for the client computer system 100 by the search engine computer system 110.

The sample notification response may include an advertiser ID identifying the advertiser, a bid ID identifying the bid represented by the notification response, a bid amount, a period for which the bid is to be cached by the Internet search engine 110, an advertising message, and a hyperlink that is to be traversed if the user clicks on the advertising message.

Based in part on the notification response, the facilitator system may compose a search result web page—also called a "search response"—potentially including an advertising message specified by the bid in the invitation response. This search result is returned to the client computer system for display.

The sample search response 145 may include a search result, the advertising message, and the hyperlink.

Lastly, the advertiser computer system sends an acceptance 144 of the new and/or enhanced dynamic advertisement, and the new and/or enhanced dynamic advertisement is submitted to and stored by the Internet search engine as a new keyword based advertising campaign 115a as part of the keyword-based advertising campaigns 115. The communication for the new or enhanced advertising campaign may take place between the facilitator system 130, or the advertiser computer system 140 may communicate directly with the ad provider, for example Google Ads or with an appropriate demand side platform (DSP).

While various functionalities and data are shown in FIG. 1 as residing on particular computer systems that are arranged in a particular way, those skilled in the art will appreciate that such functionalities and data may be distributed in various other ways across computer systems in different arrangements.

Figure 2:
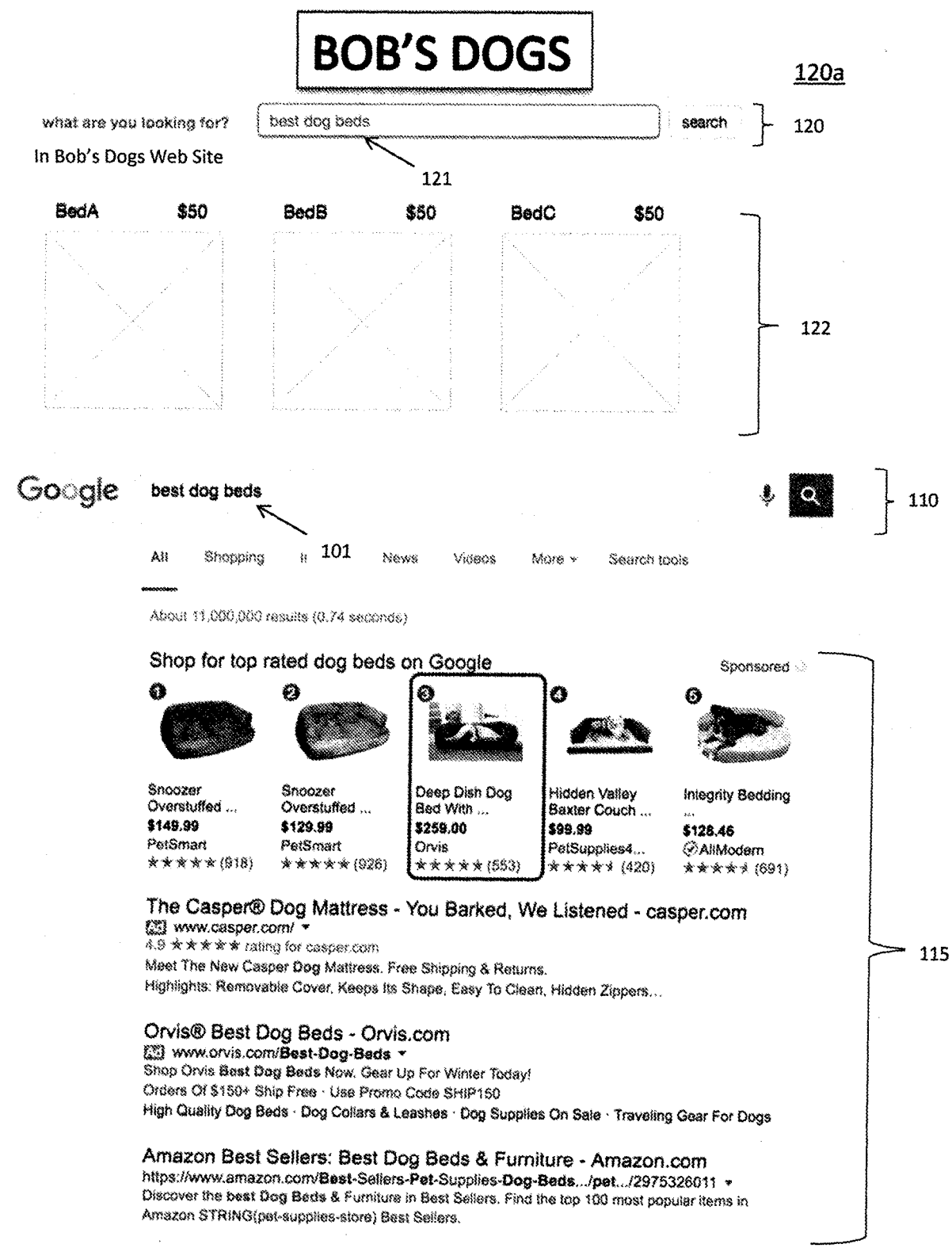
FIG. 2 is an exemplary web page whereby a site-level search engine is utilized to generate site-level search results in accordance with the present invention.

FIG. 2 is an exemplary web page whereby a site-level search engine is utilized to generate site-level search results in accordance with the present invention. The fictional web site named "BOB'S DOGS" provides a site level search engine 120 to permit a user to enter a site-level search request 121. The results of the site-level search request 121 are shown as site-specific search results 122; i.e., Bed A, Bed B, and Bed C. In accordance with this invention, the site-level search request 121 for "best dog beds" will be monitored by the facilitator system 130 to track the popularity of the terms "best dog beds". When the facilitator system 130 determines that the phrase has become popular on Bob's Dogs web site, the system 130 will notify or suggest that appropriate entities create a new ad that is triggered off of the phrase "best dog beds" which will then show up within the global search results; i.e., Internet searches 101 placed within Internet search engine 110, as an advertising campaign 115 as part of a sponsored ad or in other locations where the keyword based ads are placed. For example, the highlighted box might be the Bob's Dogs ad.

Figure 3:
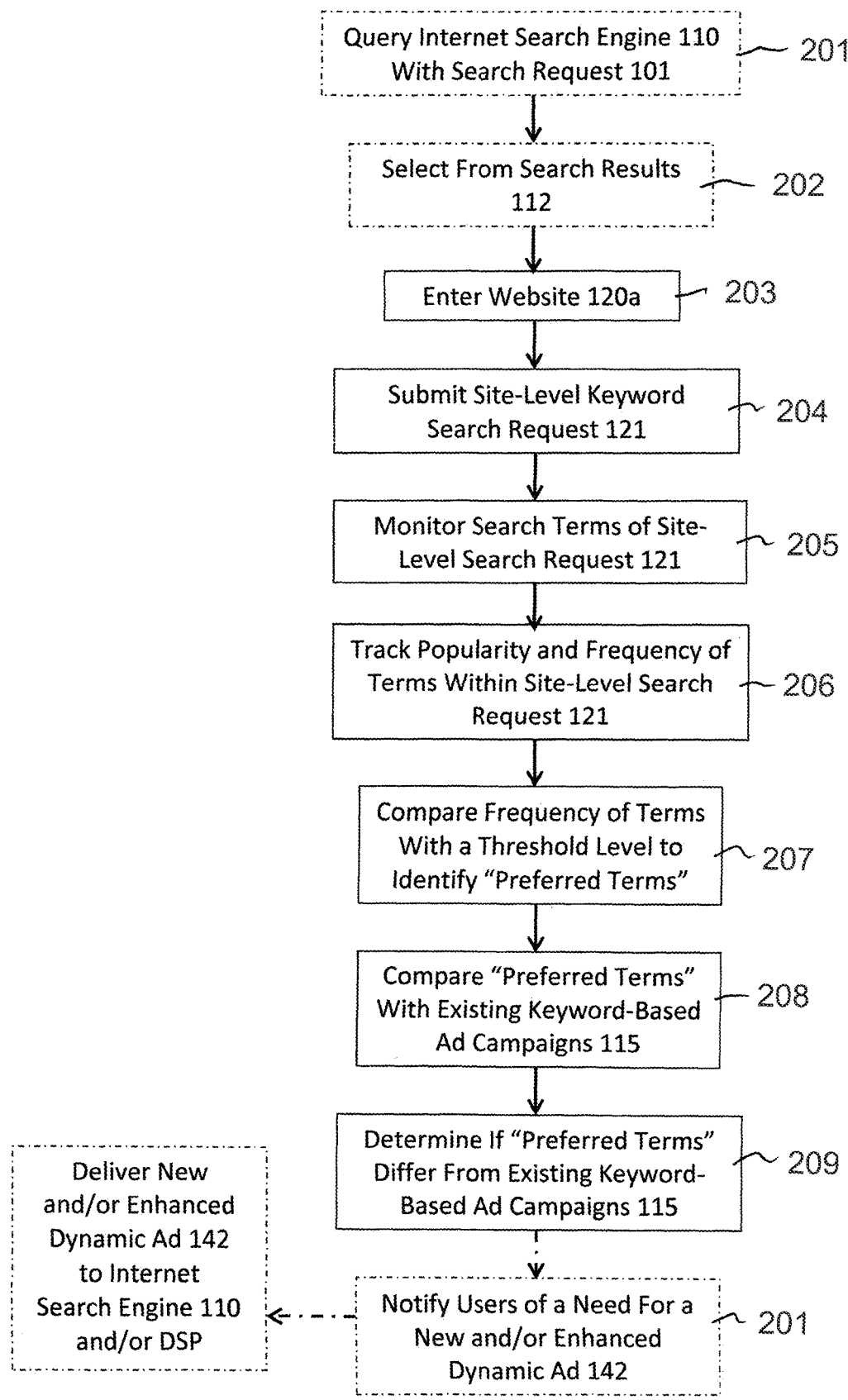
FIG. 3 is a flowchart illustrating the system and method including various steps associated with generating a new and/or enhanced keyword-based dynamic advertisement, according to an embodiment of the present invention.

FIG. 3 is a flowchart illustrating the system and method including various steps associated with generating a new and/or enhanced keyword-based dynamic advertisement, according to an embodiment of the present invention. The various steps are typically performed by the client computer system 100, the Internet search engine 120, the facilitator system 130, and the advertiser's computer system 140. In step 201, the client computer system 100 sends a query or search request 101 generated by a user to the Internet search engine 110. In response, the Internet search engine 110 sends the search result(s) 112 back to the client computer system 100. In step 202, the user selects a specific link from the search results 112, thereby opening and entering at step 203 an associated web page or website 120a. Steps 201 and 202 are shown in dashed lines in FIG. 3 to represent options features of the present invention.

Once entering the website 120a at step 203, the user may conduct a further search by entering or submitting at step 204 a site-level keyword search request 121 specific to the site-level search engine 120 of website 120a that the user is viewing. The steps 201-204 are a prelude to the method and system incorporating this invention.

At step 205, in accordance with the data flow diagram of FIG. 1, the facilitator system monitors the site-level search terms of the site-level search request 121, and the facilitator system at step 206 tracks the popularity and frequency of terms within the site-level search request 121. At step 207, the facilitator system 130 compares the frequency of the site-level search terms 121 with a predetermined threshold level to determine the level of popularity and to identify the terms that are popular terms that exceed the predetermined threshold level. The popular terms are search terms having a popularity that warrants further investigation according to the invention and the popular terms are stored as part of the historical data 132.

Next, at step 208, the facilitator system 130 compares the popular terms with terms used in existing keyword-based advertising campaigns 115 to determine if the popular terms popular in the site-level search request 121 differ from existing keyword-based advertisement campaigns 115 normally controlled by and affiliated with the Internet search engine 110. If the site-level search request 121 and related terms differ from existing keyword-based advertisement campaigns 115 already handled by the Internet search engine 110 as determined at step 209, then the facilitator system 130 at step 210 may send a notice and/or an invitation and/or a request to the advertiser's computer system 140 and/or to a demand-side platform (DSP) notifying the interested parties that there may be a need for an enhanced or new keyword-based advertising campaign 115a; i.e., a new advertising campaign that may be added to the existing keyword-based advertising campaigns 115 already stored by the Internet search engine 110.

In one embodiment, the advertiser computer system 140 may accept or reject the invitation for an enhanced or new keyword-based advertising campaign 115a to be added to the existing keyword-based advertising campaigns 115 already stored by the Internet search engine 110. There may be many reasons for the advertiser who operates the advertiser computer system to accept or reject the invitation to add the dynamic advertisement identified by the facilitator system 130. If the advertiser accepts the invitation, then the facilitator system 130 will take the necessary steps to add the new or enhanced keyword-based advertising campaign to the existing advertising campaigns handled by the Internet search engine 110.

At step 210, the facilitator system 130 notifies the appropriate users of a need for a new and/or enhanced dynamic ad 142. Alternatively, the facilitator system 130 may send a notification to a demand side platform or a demand management platform in order to facilitate a new or revised advertising campaign based on the site-level keyword analysis described above. For example, the facilitator system 130 may send an invitation for the dynamic ad to one or more advertisers. The sent invitations each may contain a copy of the search query contained in the proposed search request. In some embodiments, the facilitator system 130 may use a "stop list" of search terms specified by each advertiser that, if they occur in a search query, should preclude the sending of an invitation to the advertiser. In some embodiments, the facilitator system 130 uses a similar list of search terms specified by each advertiser that, when they appear in queries, should cause an invitation to be sent to the advertiser. In some embodiments, the facilitator system 130 uses an indication of types of queries specified by each advertiser that causes an invitation for dynamic ad to be sent to the advertiser only for queries of these types. In some embodiments, the facilitator system 130 uses a stop list or other control mechanism specified by the search engine to determine whether selected or all advertisers receive invitations for dynamic ad for particular queries. In some embodiments, before sending a notification or an invitation to a particular advertiser and/or DSP in step 210, the facilitator system 130 may check a cache of dynamic ads earlier submitted by the advertiser that may match the current search query. If an unexpired cached dynamic ad matches the current search query, the facilitator system 130 omits to send a notice to the advertiser or DSP in step 210, and rather uses the cached dynamic ad for the invitation to be sent to that advertiser.

It is further noted that the present invention encompasses a system for automatically updating or modifying an advertising campaign when a new dynamic advertisement is identified according the process described above. In other words, once it is determined that popular keywords are identified that do not form part of existing advertising campaign, the system may prompt an automated mechanism to enhance and revise existing advertisements to incorporate the new keywords or phrases. This automated process can be applied to the methodology described with respect to FIG. 3 and may also be applied to the methodology described below with respect to FIG. 4.

The present invention is intended to encompass many mechanisms for initiating the new or revised dynamic advertisement after the facilitator system 130 determines that a term or set of terms has gained degree of popularity over a threshold value (i.e., "popular terms") and after the facilitator system 130 determines that a particular popular term is not part of an existing keyword-based advertising campaign. A purpose of this invention is to determine when keyword have gained a certain popularity and then to notify relevant advertisers that these keywords are not part of existing keyword ads.

Figure 4:
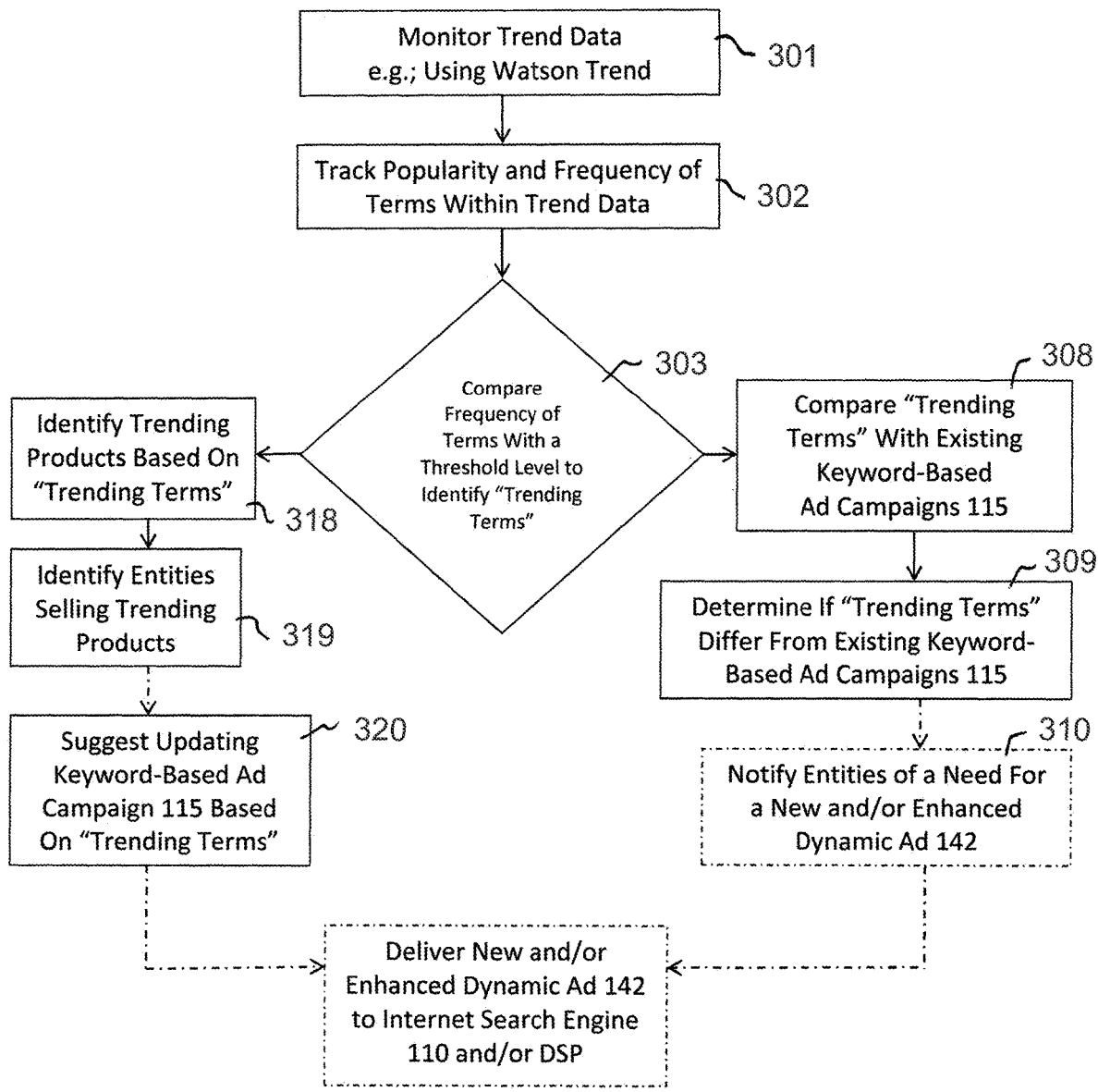
FIG. 4 is a flowchart illustrating the system and method including various steps associated with generating a new and/or enhanced keyword-based dynamic advertisement, according to an alternate embodiment of the present invention.

FIG. 4 is a flowchart illustrating the system and method including various steps associated with generating a new and/or enhanced keyword-based dynamic advertisement, according to an alternate embodiment of the present invention. These steps are typically performed by the client computer system 100, the Internet search engine 120, the facilitator system 130, and the advertiser's computer system 140. In step 301, the facilitator system 130 or other suitable computing platform monitors trending data, for example, by way of Watson Trend, by indexing or scraping techniques to accumulate data related to trending concepts on either a broad concept level or in particular categories such as health, toys, technology, beauty, etc. In one example of Watson Trend, one may built a model that surfaces common concepts discussed on, for example, a few hundred websites that have been indexed/scraped. While one may restrict one's queries to surface concepts in particular categories (e.g.; health, tech, toys, etc.), there is no need to do that in a broad perspective. For example, a specific color could surface as a trend, such that the color has a relationship to clothing, or wallpaper or other physical products. Notably, the significant trend that was surfaced in this example was an abstract concept: color. According to this invention, it is possible that an abstract color trend is influencing market decisions and supply chain. In accordance with this invention, such trends are tracked and reported.

At step 302, the facilitator system 130 tracks and monitors the popularity and frequency of specific terms within the trend data accumulated at step 301. Next, at step 303 the identified terms are compared with a threshold value to identify "trending terms" that have reached a predetermined popularity. As a result, the present system has amassed a database of terms that indicate a trend or multiple trends. In accordance with this invention, this trend data may be useful for marketing purposes. Once a trend has been identified, it may be important to determine whether a product or service may be associated with the trending data; e.g., if a trending term can identify a product then there is likely a potential advertiser with an interest is knowing about the trend data and related information. Alternatively, it may be important to identify if existing advertising campaign are using the "trending terms".

As shown in FIG. 4, the system of this invention may make a comparison of the "trending terms" with existing keyword-based advertising campaigns 115 in a similar manner to the method described above with respect to FIG. 3. Next, at step 308, the facilitator system 130 compares the trending terms with terms used in existing keyword-based advertising campaigns 115 to determine if the trending terms differ from existing keyword-based advertisement campaigns 115 normally controlled by and affiliated with the Internet search engine 110. If the trending terms differ from existing keyword-based advertisement campaigns 115 already handled by the Internet search engine 110 as determined at step 309, then the facilitator system 130 at step 310 may send a notice and/or an invitation and/or a request to the advertiser's computer system 140 and/or to a demand-side platform (DSP) notifying the interested parties that there may be a need for an enhanced or new keyword-based advertising campaign 115a; i.e., a new advertising campaign that may be added to the existing keyword-based advertising campaigns 115 already stored by the Internet search engine 110.

Alternatively, the system may at step 318 use the trending terms identified at step 303 to further identify trending products. Once trending products are identified, then at step 319 the system may identify entities; i.e., companies, marketers, retailers, etc. selling the trending products identified at step 318. Then, the facilitator system 130 at step 320 may send a notice and/or an invitation and/or a request to the advertiser's computer system 140 and/or to a demand-side platform (DSP) notifying the interested parties that there may be a need for an enhanced or new keyword-based advertising campaign 115a; i.e., a new advertising campaign that may be added to the existing keyword-based advertising campaigns 115 already stored by the Internet search engine 110.

As previously noted, the advertiser computer system 140 may accept or reject the invitation for an enhanced or new keyword-based advertising campaign 115a to be added to the existing keyword-based advertising campaigns 115 already stored by the Internet search engine 110. There may be many reasons for the advertiser who operates the advertiser computer system to accept or reject the invitation to add the dynamic advertisement identified by the facilitator system 130. If the advertiser accepts the invitation, then the facilitator system 130 will take the necessary steps to add the new or enhanced keyword-based advertising campaign to the existing advertising campaigns handled by the Internet search engine 110.

The foregoing description makes it clear that the present invention encompasses many mechanisms for initiating the new or revised dynamic advertisement after the facilitator system 130 determines that a term or set of terms has gained degree of popularity over a threshold value (i.e., "popular terms" or "trending terms") and after the facilitator system 130 determines that a particular term is not part of an existing keyword-based advertising campaign. A purpose of this invention is to determine when keywords have gained a certain popularity and then to notify relevant advertisers that these keywords are not part of existing keyword ads.

Figure 5:
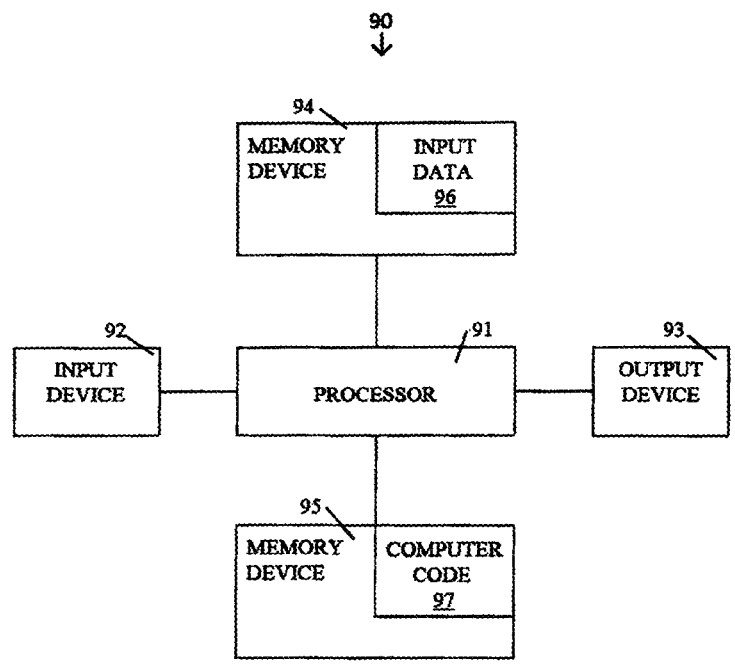
FIG. 5 illustrates a computer system used for implementing the methods of the present invention.

FIG. 5 illustrates a computer system 90 used for implementing the methods of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that includes computer-executable instructions. The computer code 97 includes software or program instructions that may implement an algorithm for implementing methods of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may be used as a computer usable storage medium (or program storage device) having a computer readable program embodied therein and/or having other data stored therein, wherein the computer readable program includes the computer code 97. Generally, a computer program product (or, alternatively, an article of manufacture) of the computer system 90 may include the computer usable storage medium (or said program storage device).

The processor 91 may represent one or more processors. The memory device 94 and/or the memory device 95 may represent one or more computer readable hardware storage devices and/or one or more memories.

Thus the present invention discloses a process for supporting, deploying and/or integrating computer infrastructure, integrating, hosting, maintaining, and deploying computer-readable code into the computer system 90, wherein the code in combination with the computer system 90 is capable of implementing the methods of the present invention.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although certain embodiments of this invention have been described above with a certain degree of particularity, those skilled in the art could make numerous alterations to the disclosed embodiments without departing from the spirit or scope of this invention.

For example, the methods described herein can be either hardware- or software-implemented.

All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method implemented by a computer for generating keyword-based advertisements, said method comprising:
    monitoring, by the computer, a website having at least one web page;
    tracking, by the computer, a site-level keyword search request of at least one of the website and the at least one web page independent of an Internet search of the Internet apart from the website and the at least one web page, said site-level keyword search request including at least one search term used to perform the site-level search request within the at least one of the web site and the at least one web page;
    comparing, by the computer, a frequency of usage of said at least one search term with a predetermined value;
    identifying, by the computer, at least one popular term from said at least one search term in response to said step of comparing said frequency of usage of said at least one search term with said predetermined value;
    monitoring, by the computer, a plurality of existing search engine level keyword-based advertising campaigns associated with the website;
    comparing, by the computer, said at least one popular term with the plurality of existing search engine level keyword-based advertising campaigns associated with the website;
    determining a usage of said at least one popular term with respect to at least one advertising campaign included in said plurality of existing search engine level keyword-based advertising campaigns associated with the website;
    generating a modified advertising campaign associated with the website based on the determined usage of said at least one popular term; and
    providing the modified advertising campaign associated with the website to at least one of a search engine and a demand-side platform for use as a search engine level keyword-based advertising campaign associated with the website.

2. The method of claim 1, further comprising:
    determining, by the computer, that said at least one popular term is not included in said at least one advertising campaign included in said plurality of existing search engine level keyword-based advertising campaigns associated with the website;
    wherein the step of generating said modified advertising campaign associated with the website includes adding said at least one popular term to said at least one advertising campaign.

3. The method of claim 1, further comprising:
    determining, by the computer, that said frequency of usage of said at least one popular term has fallen below said predetermined value;
    wherein the step of generating said modified advertising campaign associated with the website includes removing said at least one popular term from said at least one advertising campaign.

4. The method of claim 1, further comprising:
    communicating, by the computer, to at least one demand-side platform system regarding an invitation for advertisement that said popular term is not included in said at least one advertising campaign included in said plurality of existing search engine level keyword-based advertising campaigns associated with the website.

5. The method of claim 1, further comprising:
    providing, by the computer, a request to add a new search engine level keyword-based advertising campaign associated with the website to said plurality of existing search engine level keyword-based advertising campaigns associated with the website, wherein said new search engine level keyword-based advertising campaign associated with the website includes said at least one popular term.

6. The method of claim 1, further comprising:
    receiving, by the computer, authorization to include said modified advertising campaign associated with the website in said plurality of existing search engine level keyword-based advertising campaigns associated with the website.

7. The method of claim 1, further comprising:
    submitting an internet search request, prior to said step of submitting said site-level keyword search request, to an internet search engine, wherein said site-level keyword search request is not an internet search request.

8. The method of claim 1, further comprising:
    tracking, by the computer, product trends for products offered on the at least one of the website and the at least one web page based on said at least one keyword search request.

9. The method of claim 1, further comprising:
    monitoring results of said site-level keyword search request in addition to the step of monitoring the at least one search term.

10. The method of claim 1, further comprising:
    tracking a metric of a supply inventory in stock for a particular product offered on the at least one of the website and the at least one web page based on said frequency of usage and said results of said site-level keyword search request, when said frequency of usage indicate a relatively high usage of a product term related to said particular product.

11. The method of claim 1, further comprising:
    notifying, by the computer, a user of the determined usage of said at least one popular term and the generated modified advertising campaign associated with the website.

12. A system for generating keyword-based advertisements, the system comprising: a processor, wherein the processor is configured to perform:

monitoring a website having at least one web page;
tracking at least one search term of a site-level keyword search request of at least one of the website and the at least one web page independent of an Internet search of the Internet apart from the website and the at least one web page, said site-level keyword search request including the at least one search term used to perform the site-level search request within the at least one of the website and the at least one web page;
monitoring, by the computer, a plurality of existing search engine level keyword-based advertising campaigns associated with the website;
tracking a frequency of usage of the at least one search term of said site-level keyword search request;
comparing said frequency of usage of said at least one search term with a predetermined value;
identifying at least one popular term from said at least one search term in response to said step of comparing said frequency of usage of said at least one search term with said predetermined value;
comparing said at least one popular term with a database containing data pertaining to the plurality of existing search engine level keyword-based advertising campaigns associated with the web site;
determining a usage of said at least one popular term with respect to at least one advertising campaign included in said plurality of existing search engine level keyword-based advertising campaigns associated with the website;
generating a modified advertising campaign associated with the website based on the determined usage of said at least one popular term; and
providing the modified advertising campaign associated with the website to at least one of a search engine and a demand-side platform for use as a search engine level keyword-based advertising campaign associated with the website.

13. The system of claim 12, further comprising:
communicating to at least one advertiser an invitation for advertisement that said at least one popular term is not included in said at least one advertising campaign included in said plurality of existing search engine level keyword-based advertising campaigns associated with the website.

14. The system of claim 12, further comprising:
determining that said frequency of usage of said at least one popular term has fallen below said predetermined value, whereby said at least one popular term may no longer be included in said at least one advertising campaign included in said plurality of existing search engine level keyword-based advertising campaigns associated with the website.

15. The system of claim 12, further comprising:
communicating to at least one demand-side platform system regarding an invitation for advertisement that said popular term is not included in said at least one advertising campaign included in said plurality of existing search engine level keyword-based advertising campaigns associated with the website.

16. The system of claim 12, further comprising:
providing a request to add a new keyword-based advertising campaign associated with the website to said plurality of existing search engine level keyword-based advertising campaigns associated with the website.

17. The system of claim 12, further comprising:
tracking product trends for a product offered on the at least one of the web site and the at least one web page based on said at least one keyword search request.

18. A computer program product for generating keyword-based advertisements, the computer program product comprising a computer readable storage medium, the computer readable storage medium not being a propagating signal, the computer readable storage medium readable by a processing circuit and storing instructions run by the processing circuit for performing a method, said method comprising:
monitoring a website having at least one webpage;
monitoring, by the computer, a plurality of existing search engine level keyword-based advertising campaigns associated with the website;
tracking a frequency of usage of at least one search term in a site-level keyword search request of at least one of the website and the at least one web page independent of an Internet search of the Internet apart from the website and the at least one web page, said site-level keyword search request including at least one search term used to perform the site-level search request within the at least one of the website and the at least one web page;
comparing said frequency of usage of said at least one search term with a predetermined value;
identifying at least one popular term from said at least one search term in response to said step of comparing said frequency of usage of said at least one search term with said predetermined value;
comparing said at least one popular term with a database containing data pertaining to the plurality of existing search engine level keyword-based advertising campaigns associated with the web site;
determining a usage of said at least one popular term with respect to at least one advertising campaign included in said plurality of existing search engine level keyword-based advertising campaigns associated with the website;
generating a modified advertising campaign associated with the website based on the determined usage of said at least one popular term; and
providing the modified advertising campaign associated with the website to at least one of a search engine and a demand-side platform for use as a search engine level keyword-based advertising campaign associated with the website.

19. The computer program product of claim 18, further comprising:
communicating an invitation for advertisement that said at least one popular term is not included in said at least one advertising campaign included in said plurality of existing search engine level keyword-based advertising campaigns associated with the website.

20. The computer program of claim 18, further comprising:
communicating, by the computer, that said frequency of usage of said at least one popular term has fallen below said predetermined value, whereby said at least one popular term may no longer be included in said at least one advertising campaign included in said plurality of existing search engine level keyword-based advertising campaigns associated with the website.

* * * * *